US012233430B2

(12) United States Patent
Stech et al.

(10) Patent No.: US 12,233,430 B2
(45) Date of Patent: Feb. 25, 2025

(54) MOUNTING OF EXTERNAL CHARGING PROBE ON ELECTROSTATIC SPRAY GUN

(71) Applicant: Graco Minnesota Inc., Minneapolis, MN (US)

(72) Inventors: Amelia J. Stech, St. Paul, MN (US); Elisa J. McCline, Elk River, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 627 days.

(21) Appl. No.: 17/593,941

(22) PCT Filed: Apr. 3, 2020

(86) PCT No.: PCT/US2020/026556
§ 371 (c)(1),
(2) Date: Sep. 28, 2021

(87) PCT Pub. No.: WO2020/206236
PCT Pub. Date: Oct. 8, 2020

(65) Prior Publication Data

US 2022/0193703 A1 Jun. 23, 2022

Related U.S. Application Data

(60) Provisional application No. 62/829,996, filed on Apr. 5, 2019.

(51) Int. Cl.
*B05B 5/03* (2006.01)
*B05B 5/053* (2006.01)

(52) U.S. Cl.
CPC ............ *B05B 5/032* (2013.01); *B05B 5/0535* (2013.01)

(58) Field of Classification Search
CPC ...... B05B 5/032; B05B 5/0535; B05B 5/0533
(Continued)

(56) References Cited

U.S. PATENT DOCUMENTS

| | | | | |
|---|---|---|---|---|
| 3,589,607 A | | 6/1971 | Wolf et al. | |
| 3,667,675 A | * | 6/1972 | Sherman | B05B 5/032 239/698 |

(Continued)

FOREIGN PATENT DOCUMENTS

| | | |
|---|---|---|
| CN | 101534956 A | 9/2009 |
| CN | 102341182 A | 2/2012 |

(Continued)

OTHER PUBLICATIONS

First Japanese Office Action for JP Application No. 2021-558845, Dated Feb. 7, 2024, pp. 5.

(Continued)

*Primary Examiner* — Chee-Chong Lee
*Assistant Examiner* — Anna Thi Ho
(74) *Attorney, Agent, or Firm* — Kinney & Lange, P. A.

(57) ABSTRACT

A mounting configuration for an electrostatic spray gun (100) includes a probe having a first non-conductive body encasing a first conductive element and a probe mount extending from the electrostatic spray gun with a second non-conductive body encasing a second conductive element. The mounting configuration includes a first elastomeric ring (140) disposed about the second non-conductive body and configured to interface with the first non-conductive body. The first elastomeric ring (140) is configured to exert a force on the first non-conductive body to bias the first non-conductive body away from the electrostatic spray gun (100) such that the probe is secured in a home position. A pin (128) extending from one of the first non-conductive body and the second non-conductive body is seated in a notch (138) formed in the other one of the first non-conductive body and the second non-conductive body.

6 Claims, 11 Drawing Sheets

(58) Field of Classification Search
USPC .......................................................... 239/706
See application file for complete search history.

(56) References Cited

U.S. PATENT DOCUMENTS

| | | | | |
|---|---|---|---|---|
| 3,952,951 | A | 4/1976 | Raetz et al. | |
| 4,079,894 | A | 3/1978 | Harjar et al. | |
| 4,576,827 | A | 3/1986 | Hastings et al. | |
| 5,368,237 | A | 11/1994 | Fulkerson | |
| 5,409,162 | A | 4/1995 | Sickles | |
| 5,697,559 | A * | 12/1997 | Davis | B05B 5/0418 239/224 |
| 5,720,436 | A | 2/1998 | Buschor | |
| 5,904,294 | A * | 5/1999 | Knobbe | B05B 5/032 239/105 |
| 5,908,162 | A * | 6/1999 | Klein | B05B 5/032 239/708 |
| 5,938,126 | A * | 8/1999 | Rehman | B05B 5/0531 239/707 |
| 5,947,377 | A * | 9/1999 | Hansinger | B05B 5/0533 239/3 |
| 5,957,396 | A | 9/1999 | Crum et al. | |
| 6,053,437 | A | 4/2000 | Hansinger et al. | |
| 6,460,787 | B1 * | 10/2002 | Hartle | B05B 7/1263 239/691 |
| 7,351,088 | B1 | 4/2008 | Qu | |
| 7,552,882 | B2 | 6/2009 | Matsumoto et al. | |
| 9,085,001 | B2 | 7/2015 | Murata et al. | |
| 9,498,785 | B2 | 11/2016 | Sakurai et al. | |
| 9,616,440 | B2 | 4/2017 | Dietrich et al. | |
| 2003/0006322 | A1 | 1/2003 | Hartle et al. | |
| 2003/0029942 | A1 * | 2/2003 | Sanner | B05B 5/0418 239/690 |
| 2013/0004673 | A1 | 1/2013 | Ikeda | |

FOREIGN PATENT DOCUMENTS

| | | | |
|---|---|---|---|
| CN | 203860309 | U | 10/2014 |
| CN | 204135897 | U | 2/2015 |
| CN | 105903587 | B | 2/2018 |
| DE | 2412131 | A1 | 9/1975 |
| DE | 2731601 | A1 | 1/1978 |
| EP | 756899 | A2 | 2/1997 |
| JP | 2004148240 | A | 5/2004 |
| JP | 2004148273 | A | 5/2004 |
| JP | 2011078944 | A | 4/2011 |
| JP | 2012011298 | A | 1/2012 |
| KR | 20160140889 | A | 12/2016 |
| TW | 270900 | B | 2/1996 |
| TW | 351686 | B | 2/1999 |
| WO | 0166261 | A2 | 9/2001 |
| WO | 2004085078 | A1 | 10/2004 |

OTHER PUBLICATIONS

Notice of Allowance for Korean Application No. 10-2021-7035740, Dec. 28, 2023, pp. 7.
Taiwanese Office Action dated Oct. 5, 2023, for corresponding Taiwan Application No. 109111553.
Communication Pursuant to Article 94(3) EPC for EP Application No. 20722772.9, dated Oct. 5, 2022, 3 pages.
Chinese Office Action from Chinese Application Serial No. 2020800267054, dated Jun. 30, 2022, 8 pages.
International Preliminary Report on Patentability dated Sep. 28, 2021, received for corresponding PCT Application No. PCT/US2020/026556, seven pages.
International Search Report and English Translation of Box V of the Written Opinion dated Jun. 29, 2020, received for corresponding PCT Application No. PCT/US2020/026556, 14 pages.
Second ROC (Taiwan) Office Action for TW Application No. 109111553, Dated Jul. 3, 2024, pp. 5.

* cited by examiner

MOUNTING OF EXTERNAL CHARGING PROBE ON ELECTROSTATIC SPRAY GUN

CROSS-REFERENCE TO RELATED APPLICATION(S)

This application claims the benefit of U.S. Provisional Application No. 62/829,996 filed Apr. 5, 2019 for "EXTERNAL CHARGING PROBE ON ELECTROSTATIC SPRAY GUN" by A. Stech and E. McCline.

BACKGROUND

The present invention relates generally to electrostatic spray guns. More particularly, the invention relates to the mounting of an external charging probe on an electrostatic spray gun.

Electrostatic spray guns are generally used to spray a coating such as paint or a powder onto a grounded object. Electrostatic spray guns typically pass an electrical charge through the gun imparting an electric charge to the paint or powder, which is sprayed towards the grounded object by mechanical or compressed air spraying. The paint or powder accelerates toward the grounded object due to the strong electrostatic charge.

Generally, electrostatic spray guns use high voltages to generate an electrical charge, which travel through the spray gun and can travel through an external probe. It is desirable to construct an electrostatic spray gun that insulates a user from the high voltages traveling through the electrostatic spray gun and probe and that facilitates easy and robust mounting of the probe.

SUMMARY

A mounting configuration for an electrostatic spray gun includes a probe having a first non-conductive body encasing a first conductive element and a probe mount extending from the electrostatic spray gun with a second non-conductive body encasing a second conductive element. The mounting configuration includes a first elastomeric ring disposed about the second non-conductive body and configured to interface with the first non-conductive body. The first elastomeric ring is configured to exert a force on the first non-conductive body to bias the first non-conductive body away from the electrostatic spray gun such that the probe is secured in a home position. A pin extending from one of the first non-conductive body and the second non-conductive body is seated in a notch formed in the other one of the first non-conductive body and the second non-conductive body.

A method of mounting a probe to an electrostatic spray gun includes positioning a probe on an electrostatic spray gun in a starting position relative to a probe mount and shifting the probe onto the probe mount and into a starting position such that a pin of the probe passes through a gap in a flange of the probe mount. The method includes rotating the probe relative to the electrostatic spray gun and the pin travels next to the flange formed on the probe mount such that the pin is disposed between the electrostatic spray gun and the flange. The method includes an elastomeric ring mounted on the probe mount and interfacing with the probe biasing the probe away from the electrostatic spray gun and the elastomeric ring causing the pin to enter and reside in a notch of the flange such that the probe is seated in a home position.

DETAILED DESCRIPTION

Electrostatic spray guns can experience current leaks especially at assembly joints. These leaks can represent a shock hazard to a user. However, it is advantageous to be able to remove sub-parts for cleaning or replacement during the lifetime of the electrostatic spray gun, such as removal of a charging probe. Disclosed herein is a mounting configuration of an external charging probe to an electrostatic spray gun. The disclosed mounting configuration reduces current leak through the attachment site compared to conventional electrostatic spray guns. The disclosed mounting configuration further retains the probe in a home position during operation of the electrostatic spray gun.

Figure 1A:
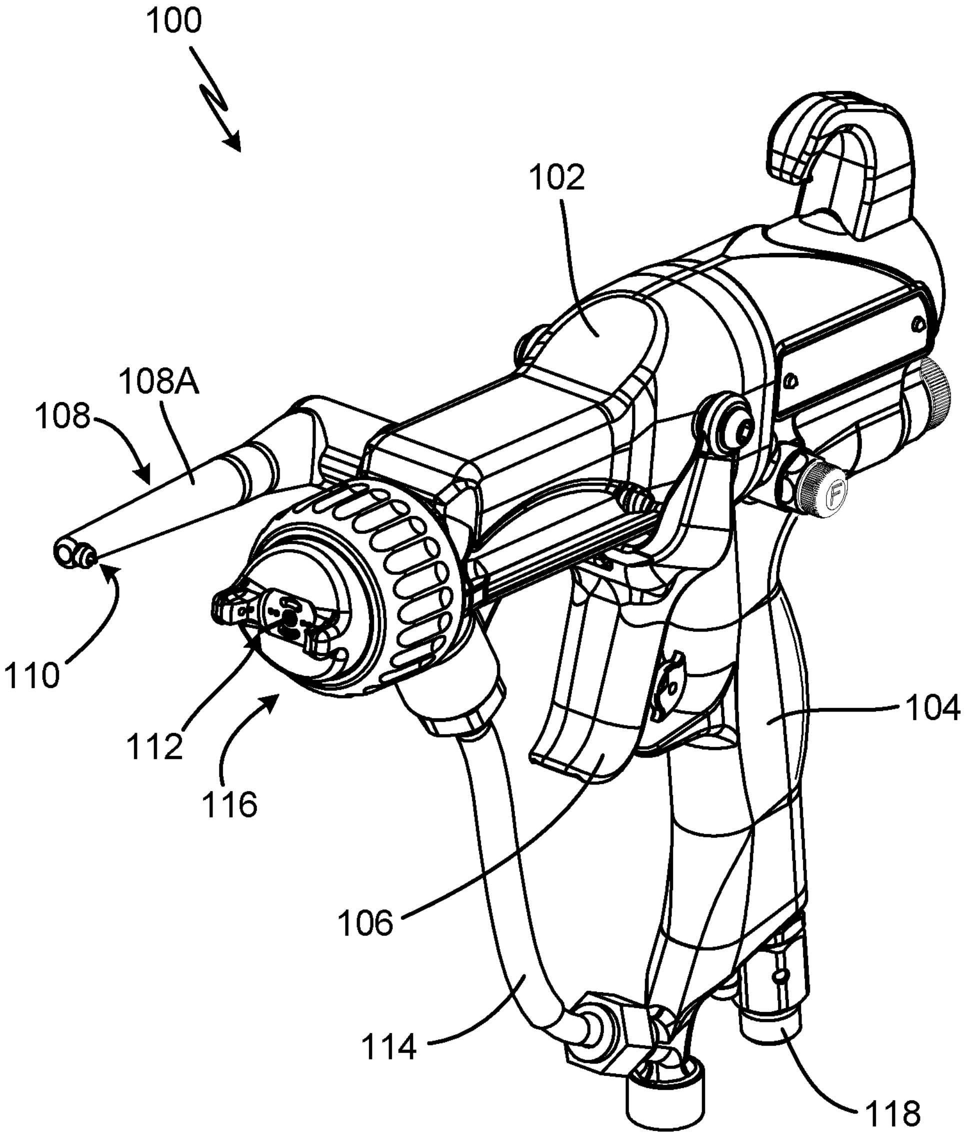
FIG. 1A is a perspective view of an electrostatic spray gun.
Figure 1B:
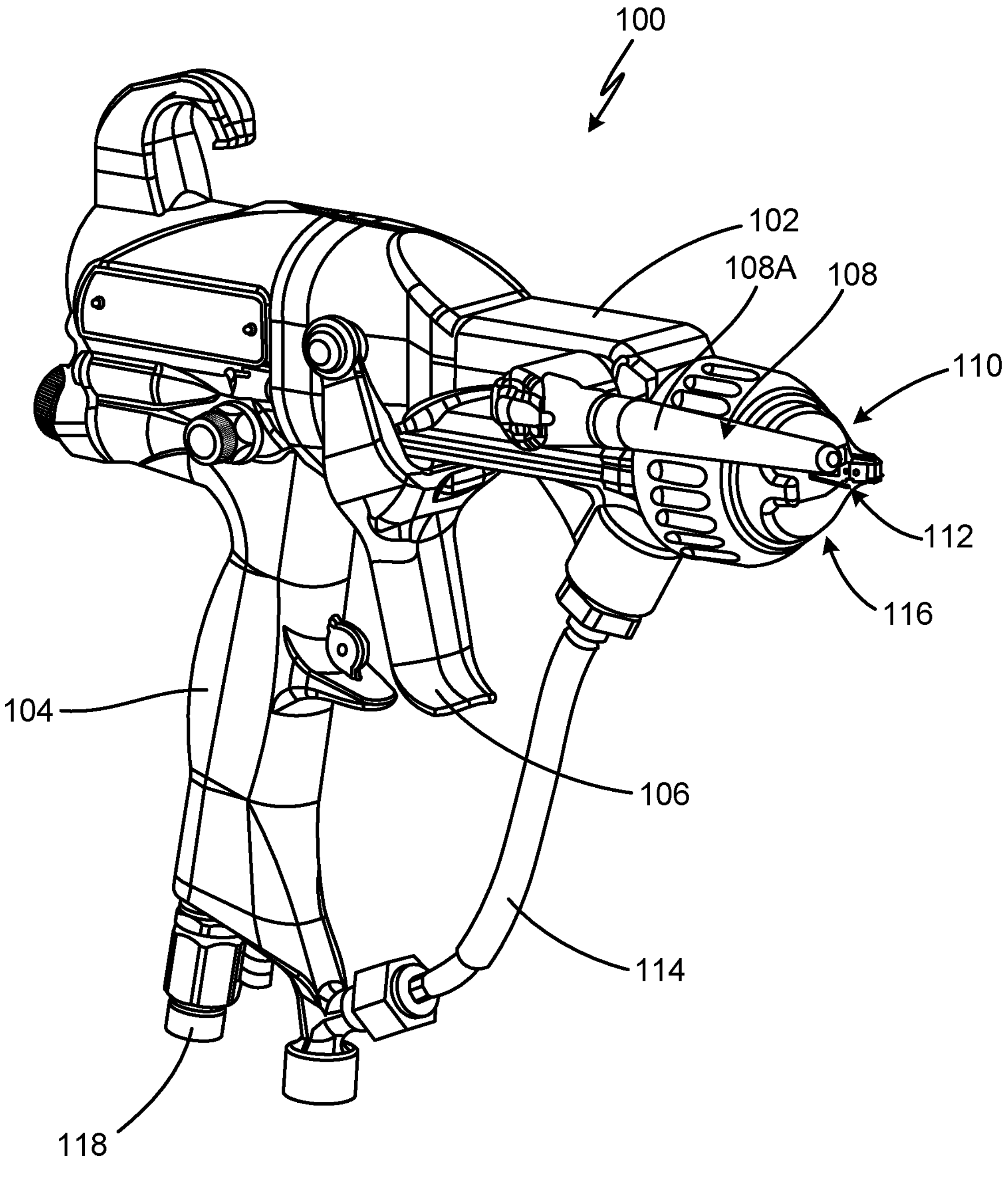
FIG. 1B is another perspective view of the electrostatic spray gun with a long probe, showing an opposite side to that shown in FIG. 1A.
Figure 1C:
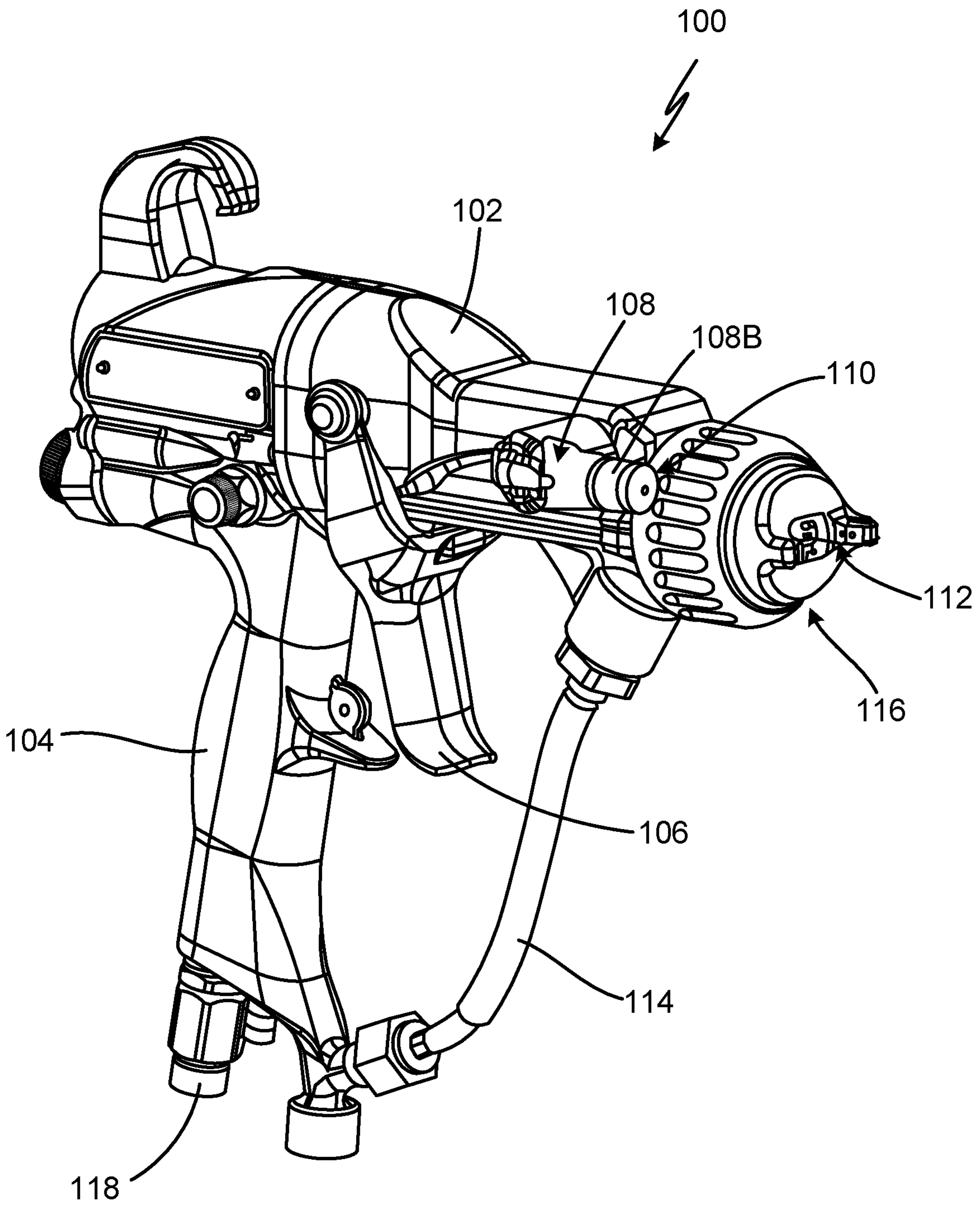
FIG. 1C is the perspective view of the electrostatic spray gun shown in FIG. 1B with a short probe.
Figure 1D:
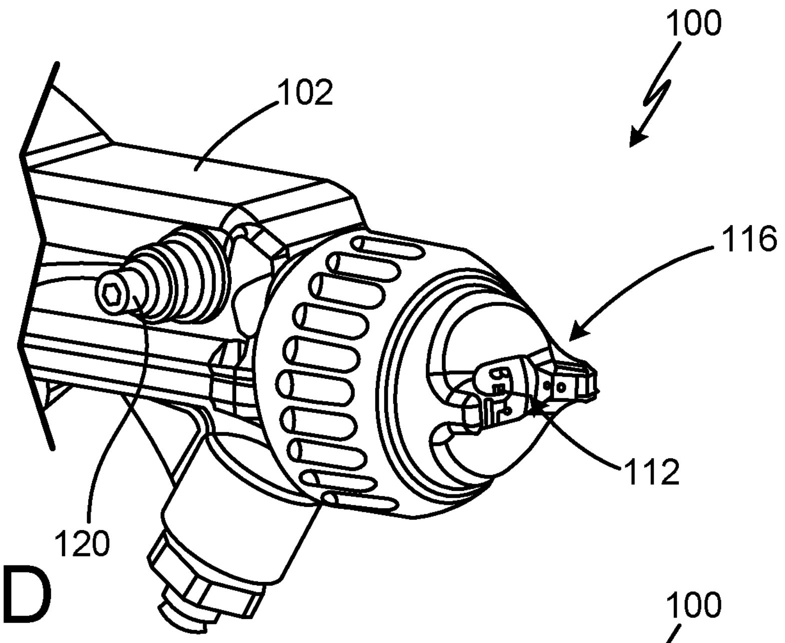
FIG. 1D is a perspective view of a portion of an electrostatic spray gun with the probe removed to show a probe mount.
Figure 1E:
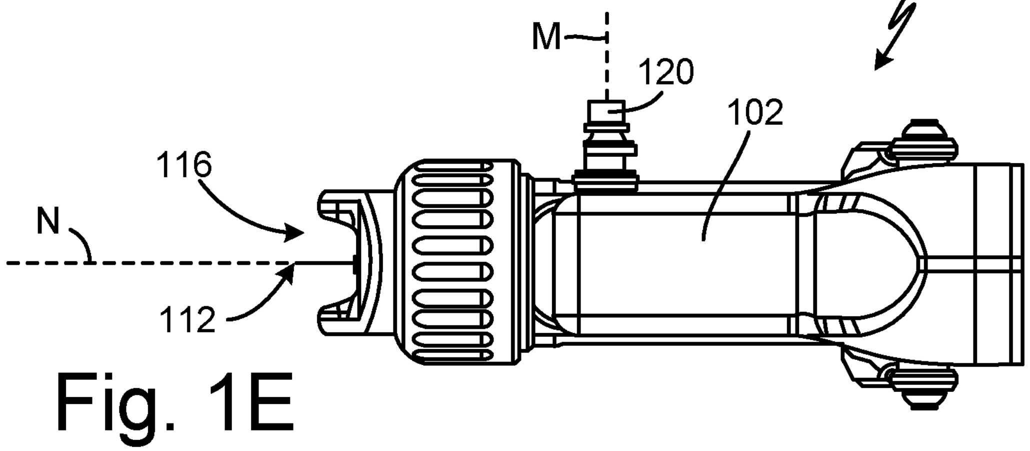
FIG. 1E is a top view of a portion of an electrostatic spray gun with the probe removed to show a probe mount.
Figure 1F:
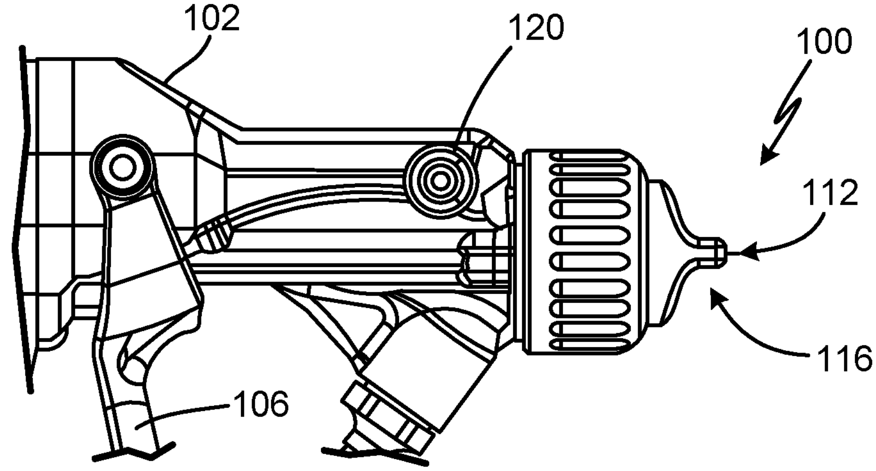
FIG. 1F is a side view of a portion of an electrostatic spray gun with the probe removed to show a probe mount.

FIG. 1A is a perspective view of electrostatic spray gun 100. FIG. 1B is another perspective view of electrostatic spray gun 100 with probe 108A, showing an opposite side to that of electrostatic spray gun 100 shown in FIG. 1A. FIG. 1C is the perspective view of electrostatic spray gun 100 shown in FIG. 1B with short probe 108B mounted on electrostatic spray gun 100. FIG. 1D is a perspective view of electrostatic spray gun 100 with probe 108 removed to show probe mount 120. FIG. 1E is a top view of electrostatic spray gun 100 with probe 108 removed to show probe mount 120. FIG. 1F is a side view of electrostatic spray gun 100 with probe 108 removed to show probe mount 120. FIGS. 1A-1F will be discussed together. Probes 108A and 108B will be discussed together and will be referred to collectively as probe 108.

Figure 2A:
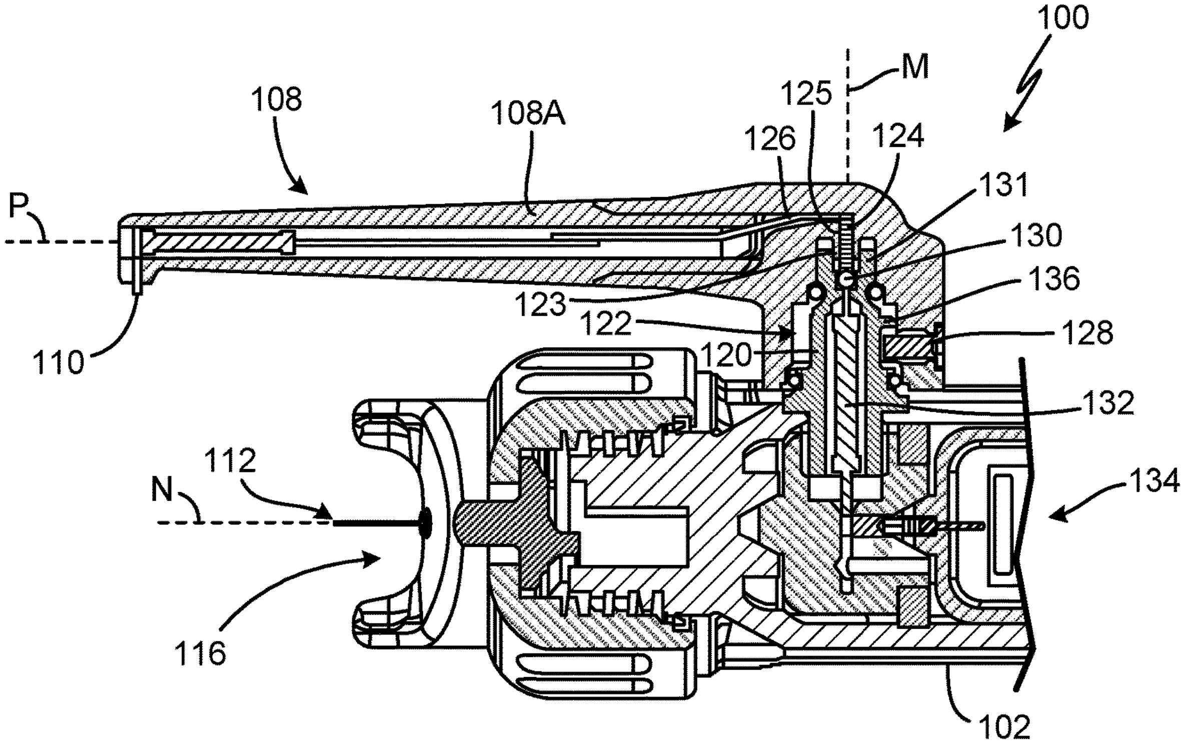
FIG. 2A is a top cross-sectional view of an electrostatic spray gun with a long probe mounted on the electrostatic spray gun.
Figure 2B:
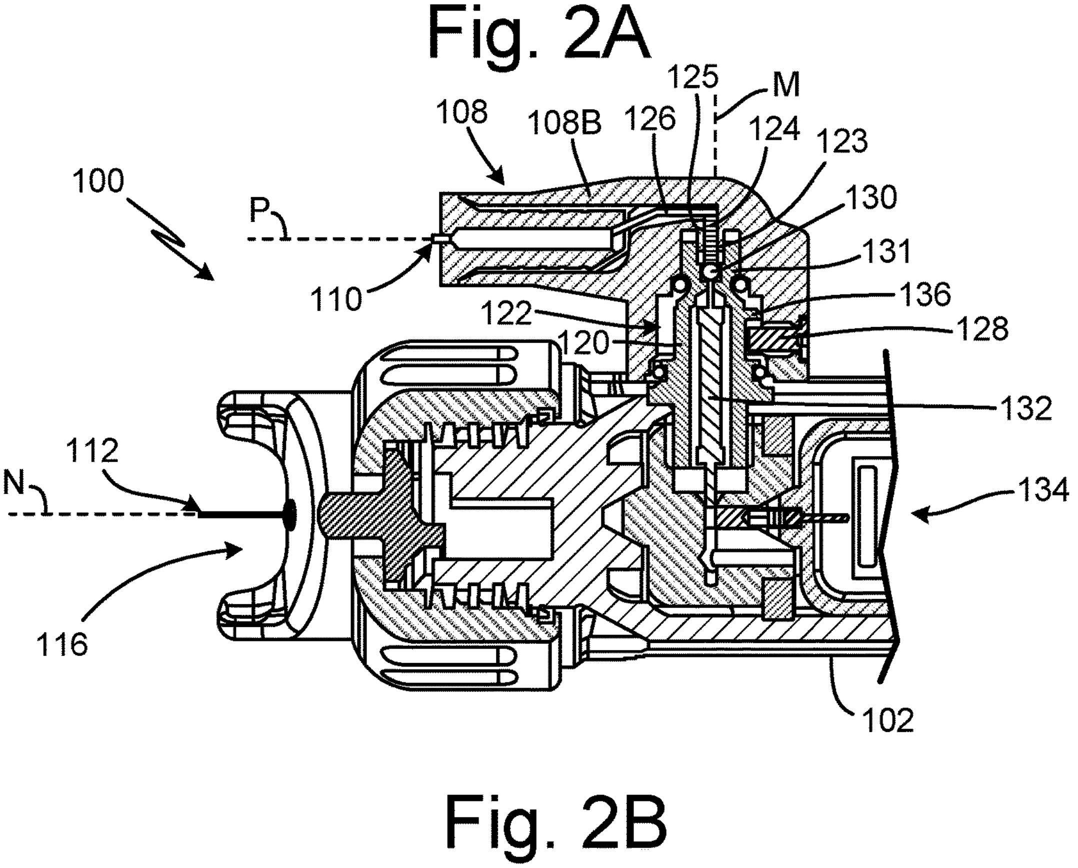
FIG. 2B is a top cross-sectional view of an electrostatic spray gun with a short probe mounted on the electrostatic spray gun.

FIGS. 1A-1F show electrostatic spray gun 100 including barrel 102, handle 104, trigger 106, probe 108, probe electrode 110, needle electrode 112, liquid line 114, air cap 116, air connection 118, needle axis N, mount axis M, and probe axis P(FIGS. 2A and 2B). Electrostatic spray gun 100 has barrel 102 attached to handle 104 and trigger 106. Handle 104 is contoured to rest comfortably in a user's hand. Barrel 102 is arranged above the user's hand during operation and trigger 106 is adjacent to handle 104 such that trigger 106 can be actuated by a user's fingers.

Probe 108 is connected to barrel 102 during operation of electrostatic spray gun 100 and can be easily removed by a user. FIGS. 1A and 1B show long probe 108A and FIG. 1C shows short probe 108B. Probe 108 includes probe electrode 110, which is positioned at an end of probe 108 opposite to probe mount 120. Probe axis P is transverse to mount axis M. In some examples, probe axis P is orthogonal to mount axis M. In some embodiments, probe 108 can have two positions, a starting position and a home position. In some embodiments, probe 108 can have more than two positions.

FIGS. 1A-1C show probe 108 in the home position. Barrel 102 includes needle electrode 112 attached to an end of barrel 102 opposite handle 104. Needle electrode 112 extends along needle axis N of electrostatic spray gun 100 (shown in FIG. 1E). FIGS. 1A and 1B show that probe 108A extends further than needle electrode 112 axially along needle axis N away from mount axis M (shown in FIG. 1E). Probe 108A is a long probe in that probe electrode 110 of probe 108A extends axially beyond a distal end of needle electrode 112. FIG. 1C shows that probe 108B extends less than needle electrode 112 axially along needle axis N away from mount axis M. Probe 108B is a short probe in that probe electrode 110 of probe 108B does not extend beyond the distal end of needle electrode 112. In the example shown, probe 108B axially overlaps with portions of spray gun 100, including air cap 116. It is understood that probe 108 can be of other lengths than probes 108A and 108B shown in FIGS. 1A-1C to generate an electric field. The probe 108 generates an electric field proximate the fluid outlet around needle electrode 112 and between probe electrode 110 and needle electrode 112. The generated electric field ionizes molecules that pass through the electric field. The probe length can be optimized based on factors such as, for example, ionization efficiency of molecules that pass through the electric field and reduction of the deposition rate of molecules on the electrodes. For example, as sprayed material exits the air cap, longer probes can extend into the spraying region, which requires users to stop and clean the probe electrode more often.

Liquid line 114 is attached to handle 104 and to barrel 102 and is configured to deliver a liquid from a liquid reservoir (not shown in FIGS. 1A-1C) to air cap 116, through which needle electrode 112 extends. The liquid can be any liquid capable of ionization in an electric field such as, for example, waterborne paint. Air connection 118 is attached to handle 104 and delivers air from an air reservoir (not shown in FIGS. 1A-1C) such as, for example, an air compressor or a compressed air tank through handle 104 and barrel 102 to air cap 116.

Operationally, electrostatic spray gun 100 can produce an electric field between probe electrode 110 and needle electrode 112 when probe 108 is in the home position. Although the electrostatic spray gun can still generate an electric field even when the probe is inadvertently knocked from the home position, the disclosed mounting configuration advantageously helps to retain the probe in a home position during operation of the electrostatic spray gun. The generated electric field ionizes molecules as they travel through the electric field, including paint molecules. Liquid from liquid line 114 is combined with air from air connection 118 as the two fluids are ejected from air cap 116. The air shapes the liquid as the liquid is accelerated through the generated electric field, which ionizes molecules that travel through the electric field, to generate a charged fluid spray. The ionized molecules are attracted toward grounded substrates.

Barrel 102 and probe 108 can be formed of any non-conductive material such as, for example, a non-conductive polymer. Barrel 102 and probe 108 can be formed of the same material or different materials. The non-conductive material helps to protect a user from the current traveling through the electrostatic spray gun during use. Considerations such as, for example, durability, non-conductivity, weight, cost, and comfort to a user, can be used to optimize the composition of each material for barrel 102, and probe 108.

FIG. 2A is a top cross-sectional view of electrostatic spray gun 100 with probe 108A mounted on the electrostatic spray gun. FIG. 2B is a top cross-sectional view of electrostatic spray gun 100 with probe 108B mounted on the electrostatic spray gun. FIGS. 2A and 2B will be discussed together. FIGS. 2A and 2B show electrostatic spray gun 100, barrel 102, probe 108, probe electrode 110, needle electrode 112, air cap 116, probe mount 120, recess 122, projection 123, spring 124, cavity 125, wire 126, pin 128, conductive ball 130, crown 131, resistor wire 132, power source 134, flange 136, needle axis N, mount axis M, and probe axis P.

Probe 108 is connected to barrel 102 during operation of electrostatic spray gun 100 and can be easily removed by a user. FIG. 2A shows probe 108A and FIG. 2B shows probe 108B. Probe 108 includes probe electrode 110, which is positioned at an end of probe 108 opposite to mount axis M. Probe 108 has two positions, a starting position, at the beginning of installation, and a home position, during operation. FIGS. 2A and 2B show probe 108 in the home position. Barrel 102 includes needle electrode 112 attached to an end opposite the handle 104 along needle axis N(FIGS. 1A-1F). Air cap 116 is disposed at an end of barrel 102 and needle electrode 112 extends along needle axis N and through a central opening in air cap 116. Air cap 116 has both liquid and air outlets that direct the liquid and air to mix and atomize the liquid as the liquid and air exit air cap 116. It is understood that probe 108 can be of other lengths than those shown in FIGS. 2A and 2B to generate the electric field and ionize molecules that pass through the electric field. The probe length can be optimized based on factors such as, for example, ionization efficiency of molecules that pass through the electric field and deposition rate of molecules on the electrodes.

Probe 108 has recess 122, which is configured to receive probe mount 120. Recess 122 includes circular projection 123, which extends axially inward along mount axis M toward barrel 102 from substantially the center of recess 122. Spring 124 is positioned in cavity 125, which is positioned in substantially the center of circular projection 123. Spring 124 is attached to wire 126, which extends to and connects to probe electrode 110. Pin 128 is configured to interface with notch 138 (best seen in FIG. 4B) to secure probe 108 in the home position during operation of electrostatic spray gun 100. Spring 124 can exert a force to push probe 108 away from probe mount 120 to secure pin 128 in notch 138 during operation of electrostatic spray gun 100. In one embodiment, as shown in FIGS. 2A and 2B, pin 128 is attached to probe 108 and extends into recess 122. Pin 128 is positioned on the probe opposite from probe electrode 110 along probe axis P. In one embodiment, pin 128 is attached to probe mount 120. Pin 128 extends into recess 122 and helps to retain probe 108 on probe mount 120 during operation of electrostatic spray gun 100. In one embodiment, pin 128 is removable from probe 108 or probe mount 120 and can be replaced with a new pin. For example, pin 128 can be connected to one of probe 108 and probe mount 120 by a threaded interface, among other options. Pin 128 can experience wear over time and the ability to replace just pin 128 rather than a larger part such as probe 108 or probe mount 120 provides substantial cost savings to a user.

Probe mount 120 is connected to barrel 102 and extends axially along mount axis M beyond the edge of barrel 102. Probe mount 120 can be connected to barrel 102 in any desired manner such as, for example, interfaced threading, press-fitting, or adhesive, among other options. In some examples, probe mount 120 is removably connected to barrel 102, such as by the interfaced threading. Conductive ball 130 is positioned within crown 131 of probe mount 120 and at an end of probe mount 120 positioned axially opposite barrel 102 along mount axis M. Conductive ball 130 is attached to a first end of resistance wire 132; and power source 134 is electrically connected to a second end of resistance wire 132. Operationally, electrostatic spray gun 100 can produce an electric field between probe electrode 110 and needle electrode 112 when probe 108 is in the home position. Power source 134 supplies a current through resistance wire 132, conductive ball 130, spring 124, and wire 126 and to probe electrode 110. While probe mount 120 is discussed as extending from barrel 102 and being received by probe 108, it is understood that, in some examples, probe mount 120 can extend from probe 108 and be received by barrel 102. The electrical and mechanical interfaces between probe mount 120 and probe 108, including with spring 124 and first elastomeric ring 140, can be formed within barrel 102 between barrel 102 and/or components within barrel 102 and the portion of probe 108 and/or probe mount 120 extending into and being received by barrel 102. For example, probe mount 120 can be fixed to probe 108 or formed as an integral part with probe 108 to be received within barrel 102.

The generated electric field ionizes molecules as they travel through the electric field, which can include, for example, paint molecules. Liquid and air are emitted from air cap 116. The combined liquid and air are accelerated through the generated electric field, which ionizes molecules that travel through the electric field. The ionized molecules are attracted toward grounded substrates.

Figure 3A:
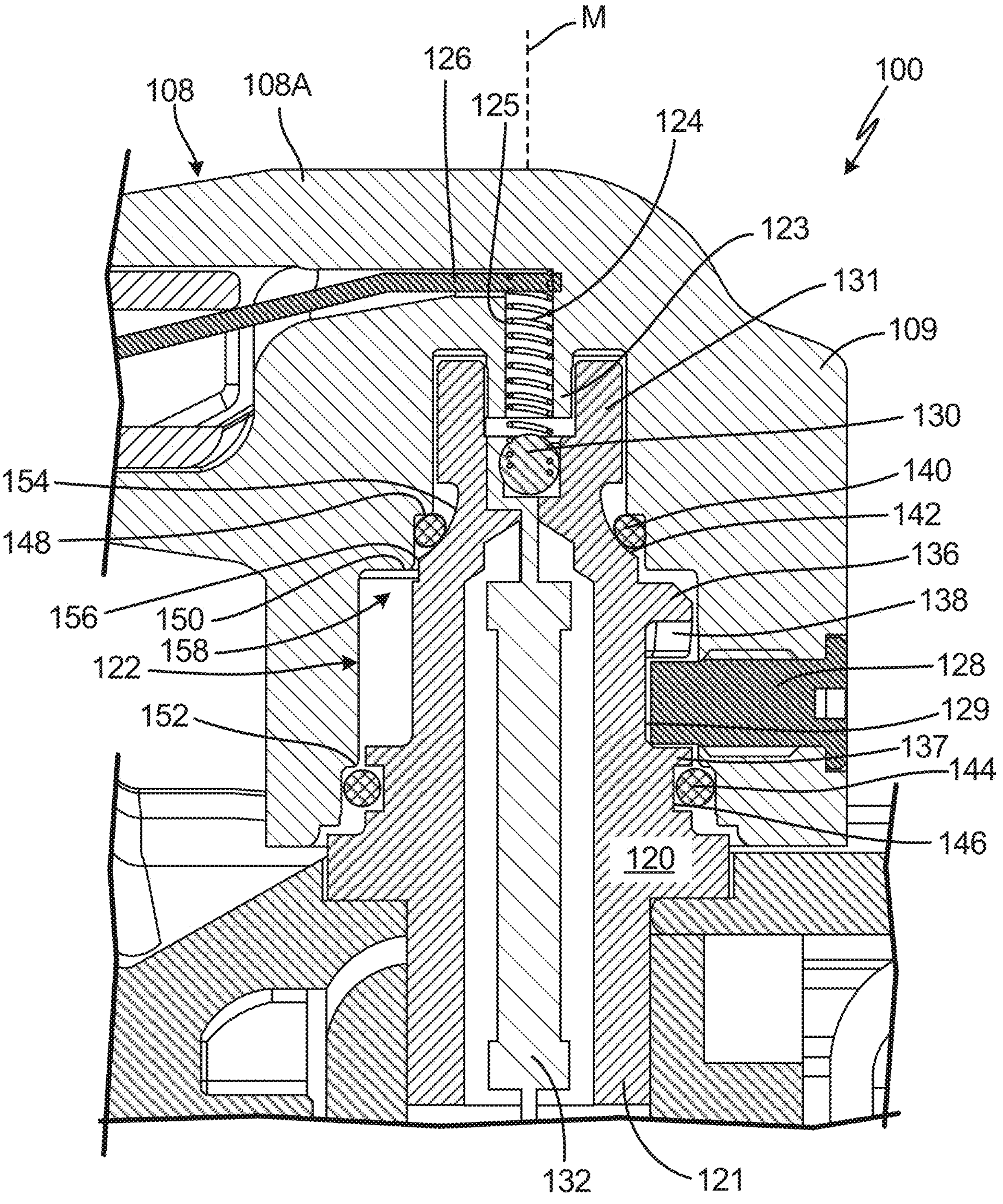
FIG. 3A is an enlarged cross-sectional view showing a probe in a first mounting state.
Figure 3B:
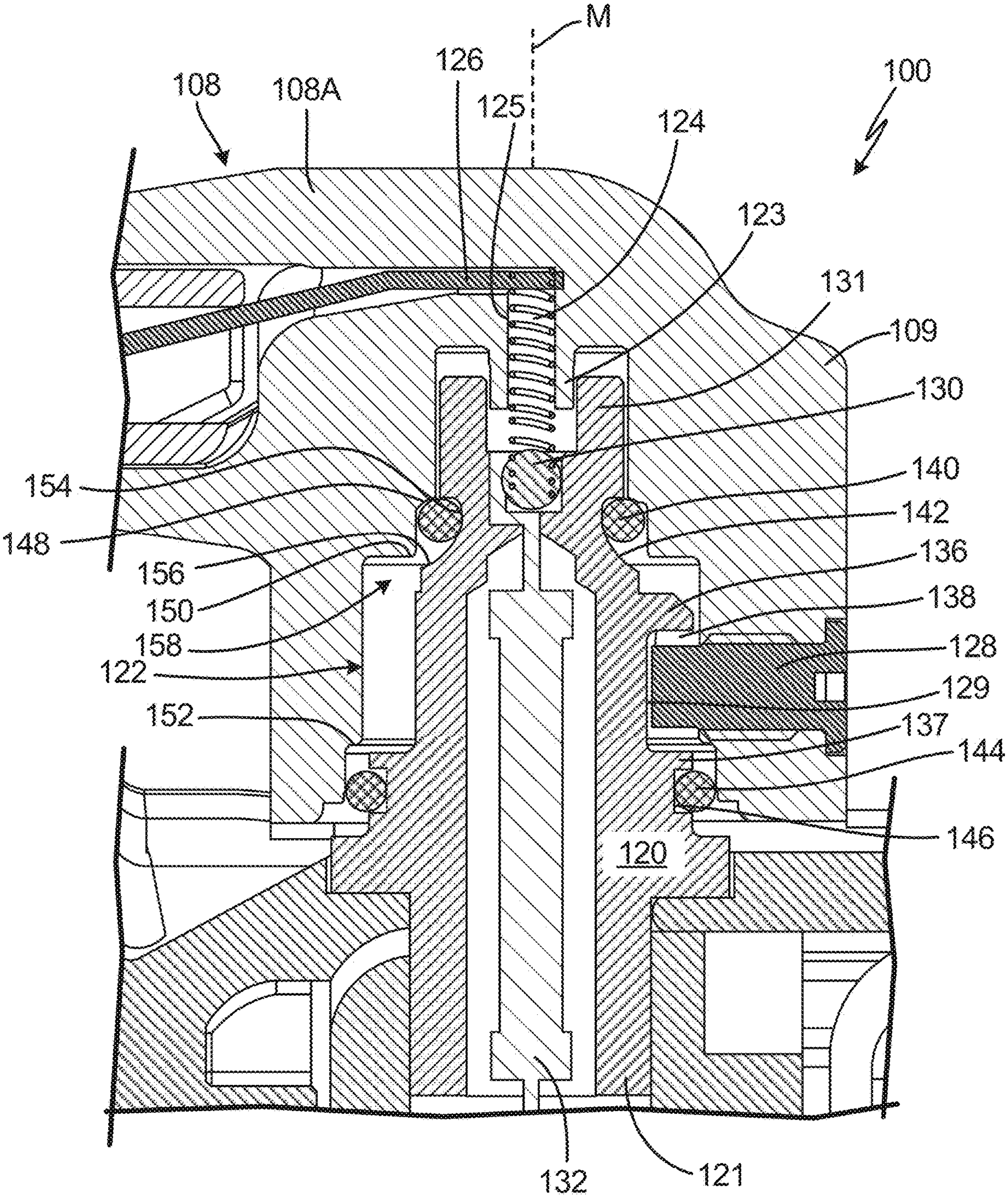
FIG. 3B is an enlarged cross-sectional view showing a probe in a second mounting state.

FIG. 3A is an enlarged cross-sectional view showing probe 108 in a first mounting state. FIG. 3B is an enlarged cross-sectional view showing probe 108 in a second mounting state. FIGS. 3A and 3B will be discussed together. FIGS. 3A and 3B show probe 108, probe body 109, barrel 102, probe mount 120, probe mount body 121, recess 122, circular projection 123, spring 124, cavity 125, wire 126, pin 128, pin slot 129, conductive ball 130, crown 131, resistor wire 132, flange 136, flange 137, notch 138, first elastomeric ring 140, dynamic groove 142, second elastomeric ring 144, static groove 146, and shoulders 148, 150, 152, dynamic groove first end 154, and dynamic groove second end 156.

Probe 108 is configured to attach to probe mount 120 during operation of electrostatic spray gun 100 and can be easily removed by a user. Probe mount 120 both mechanically and electrically connects probe 108 to electrostatic spray gun 100. Probe 108 has recess 122, which is configured to receive probe mount 120. Recess 122 includes circular projection 123, which extends axially inward along mount axis M toward barrel 102 from substantially the center of recess 122. Spring 124 is positioned in cavity 125, which is positioned in substantially the center of circular projection 123. Spring 124 is attached to wire 126, which extends to and connects to probe electrode 110. Probe body 109 of probe 108 is non-conductive and encases the conductive elements of probe 108 such as spring 124, wire 126, and part of probe electrode 110. Probe mount 120 is connected to barrel 102 and extends axially along mount axis M beyond the edge of barrel 102. Probe mount 120 can be removably connected to barrel 102 in any desired manner such as, for example, interfaced threading.

Pin 128 is configured to secure probe 108 to probe mount 120 with probe 108 in the home position. In the example shown, pin 128 is attached to probe body 109 of probe 108 and extends through probe body 109 into an interior of recess 122. In the example shown, pin 128 is positioned such that probe mount 120 is disposed axially between pin 128 and probe electrode 110 along probe axis P with probe 108 mounted on probe mount 120 in the home position. In some embodiments, pin 128 is attached to and projects from probe mount body 121 of probe mount 120. Pin 128 protrudes into recess 122 and retains probe 108 in the home position on probe mount 120 during operation of electrostatic spray gun 100. In some embodiments, pin 128 is removable from probe 108 or probe mount 120 and can be replaced with a new pin 128. For example, pin 128 can be connected to the probe 108 or probe mount 120 by interfaced threading, among other options. Pin 128 can experience wear over time and the ability to replace just pin 128 rather than a larger part such as probe 108 or probe mount 120 can result in substantial cost savings to a user.

Conductive ball 130 is positioned within crown 131 of probe mount 120 at an end of probe mount 120 axially along mount axis M opposite the end connected to barrel 102. Conductive ball 130 is attached to a first end of resistance wire 132 extending axially through probe mount body 121 of probe mount 120; and a power source is electrically connected to a second end of resistance wire 132. In other words, probe mount body 121, which is non-conductive, encases conductive elements such as conductive ball 130 and resistance wire 132. In one embodiment, probe mount 120 includes flange 136 projecting radially from probe mount body 121 of probe mount 120. Flange 136 extends partially about probe mount body 121 of probe mount 120. Flange 136 has notch 138 configured to receive pin 128. FIG. 3A shows pin 128 adjacent to notch 138. FIG. 3B shows pin 128 positioned in notch 138, which can be referred to as the home position.

First elastomeric ring 140 resides in dynamic groove 142, which is formed on probe mount body 121 of probe mount 120. Dynamic groove 142 is positioned adjacent to crown 131 on probe mount 120 and has first end 154 and second end 156 (shown in FIGS. 4A-4C). Dynamic groove first end 154 has a smaller diameter compared to dynamic groove second end 156. The diameter of dynamic groove 142 smoothly changes between first end 154 and second end 156. First elastomeric ring 140 is formed of a non-conductive elastic material. In some embodiments, first elastomeric ring 140 can be an O-ring. Dynamic groove 142 is shaped to allow first elastomeric ring 140 to stretch to increase the diameter of ring 140 as probe 108 is mounted on probe mount 120. First elastomeric ring 140 provides an elastic force that seats pin 128 in notch 138 with probe 108 in the home position and during operation of electrostatic spray gun 100. Spring 124 and first elastomeric ring 140 can work together to provide a force to seat and secure pin 128 in notch 138 during operation of electrostatic spray gun 100. Second elastomeric ring 144 resides in static groove 146, which is positioned adjacent to barrel 102. Second elastomeric ring 144 is formed of a non-conductive elastic material. In some embodiments, second elastomeric ring 144 can be an O-ring.

Probe body 109 includes shoulders 148, 150, and 152. Shoulder 148 is positioned adjacent to first elastomeric ring 140. Shoulder 148 interfaces with first elastomeric ring 140 and is configured to push first elastomeric ring 140 downward along dynamic groove 142 and toward barrel 102 during the mounting process. Shoulder 150 is positioned adjacent to shoulder 148 and prevents first elastomeric ring 140 from being pushed out of dynamic groove 142 during the mounting process. Shoulder 152 can interface with second elastomeric ring 144 and provide a stop such that probe 108 is not easily pushed further onto probe mount 120.

During mounting, probe 108 is positioned over probe mount 120 and shifted relative probe mount 120 and towards barrel 112. Shoulder 148 engages first elastomeric ring 140 and drives first elastomeric ring 140 from dynamic groove first end 154 along dynamic groove 142 towards dynamic groove second end 156 of dynamic groove 142. First elastomeric ring 140 is thus driven from the position shown in FIG. 3B to the position shown in FIG. 3A. Pin 128 passes through gap 158 (shown in FIG. 4C) in flange 136 and into recess 122. Probe 108 is then rotated about probe mount 120 and to the position shown in FIG. 3A. As discussed in more detail below, pin 128 interfaces with a side of flange 136 facing barrel 102 and a side of flange 137 facing crown 131 as probe 108 is rotated. The side of flange 136 facing barrel 102 and the side of flange 137 facing crown 131 together define pin slot 129. When probe 108 reaches the position shown in FIG. 3A, the force exerted on probe 108 by first elastomeric ring 140 pushes probe 108 away from barrel 102 and first elastomeric ring 140 moves along dynamic groove 142 back to the position shown in FIG. 3B. First elastomeric ring 140 biasing probe 108 away from barrel 102 causes pin 128 to enter and seat within notch 138. Pin 128 seating within notch 138 and first elastomeric ring 140 biasing probe 108 away from barrel 102, maintaining pin 128 in notch 138, secures probe 108 to probe mount 120 in the home position.

Figure 4A:
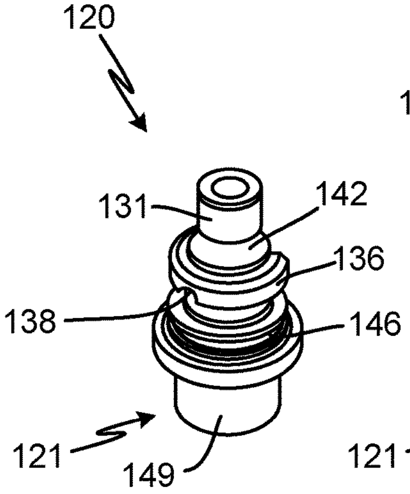
FIG. 4A is a perspective view of the probe mount.
Figure 4B:
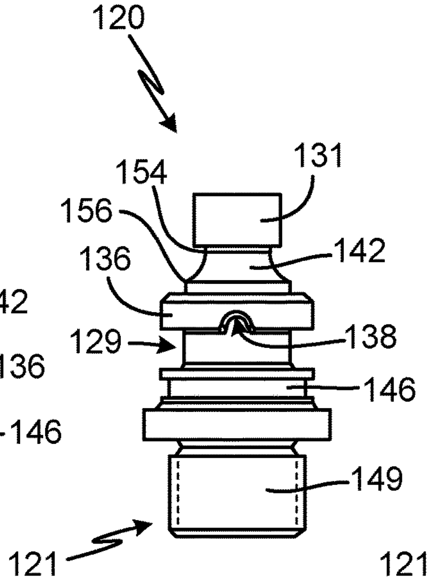
FIG. 4B is a rear view of the probe mount showing a flange with a notch.
Figure 4C:
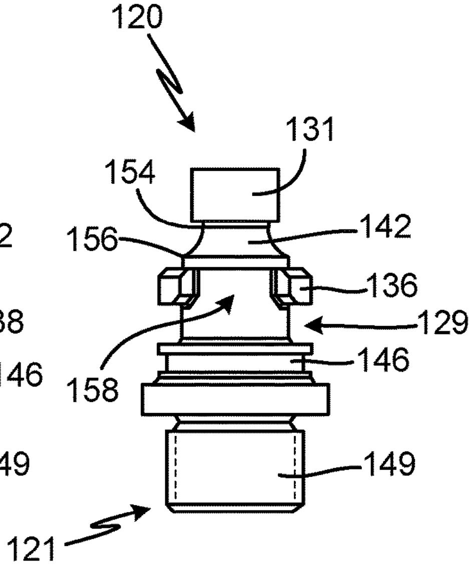
FIG. 4C is a front view of the probe mount showing the flange with a gap.

FIG. 4A is a perspective view of probe mount 120. FIG. 4B is a rear view of probe mount 120 showing flange 136 with notch 138. FIG. 4C is a front view of probe mount 120 showing flange 136 with gap 158. FIGS. 4A-4C will be discussed together. FIGS. 4A-4C show probe mount 120 including probe mount body 121, pin slot 129, crown 131, flange 136, flange 137, notch 138, dynamic groove 142, static groove 146, gap 158, mounting end 149, dynamic groove first end 154, dynamic groove second end 156, and gap 158.

Dynamic groove 142 has first end 154 and second end 156. Dynamic groove first end 154 has a smaller diameter compared to dynamic groove second end 156. The diameter of dynamic groove 142 smoothly changes between first end 154 and second end 156. In some embodiments, the shape of dynamic groove 142 between first end 154 and second end 156 is linear. In some embodiments, the shape of dynamic groove 142 between first end 154 and second end 156 is non-linear, such as a curve.

Flange 136 projects generally radially from probe mount body 121 and is positioned between dynamic groove 142 and static groove 146. Flange 136 has gap 158 to allow pin 128 to pass through flange 136 and into pin slot 129 defined between flange 136 and lower flange 137. Notch 138 is formed on a lower surface of flange 136 and is configured to receive pin 128 (best seen in FIGS. 3A and 3B) to maintain probe 108 (best seen in FIGS. 1A-1C) in the home position. In the example shown, notch 138 is disposed on an opposite side of probe mount body 121 from gap 158. Notch 138 being disposed on an opposite side of probe mount body 121 from gap 158 prevents probe 108 from inadvertently detaching from electrostatic spray gun 100 during operation, even if probe 108 is knocked and disengages from the home position.

As shown in FIGS. 4A-4C, probe mount 120 can include crown 131 positioned at an opposite end of probe mount 120 from mounting end 149. Moving axially along probe mount body 121, probe mount 120 includes crown 131, dynamic groove 142, flange 136, pin slot 129, lower flange 137, static groove 146, and mounting end 149.

Figure 5A:
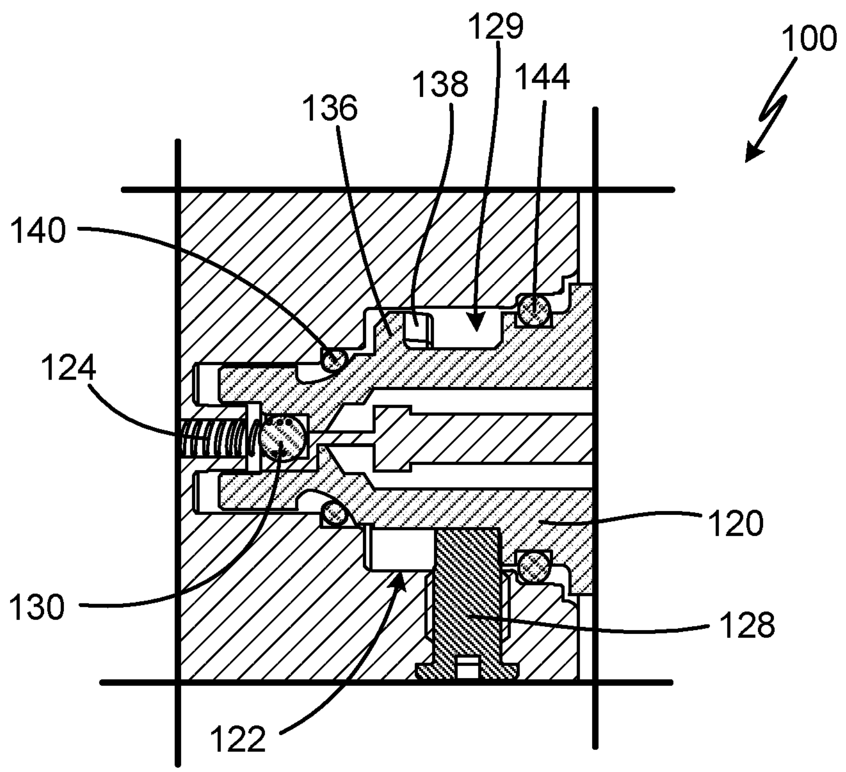
FIG. 5A is a cross-sectional view of the probe adjacent to the starting position.
Figure 5B:
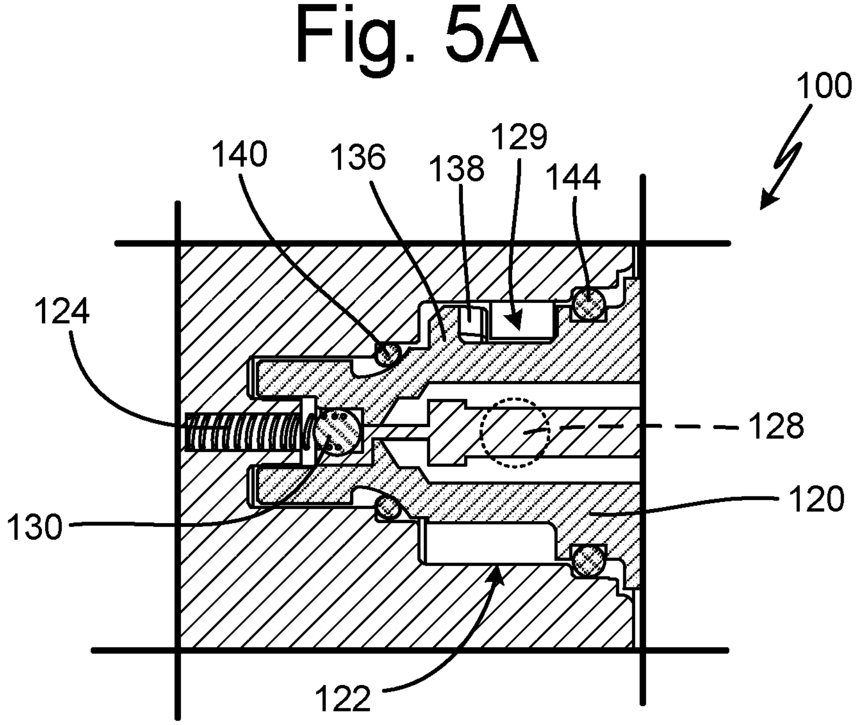
FIG. 5B is a cross-sectional view of the probe intermediate the starting position and the home position.
Figure 5C:
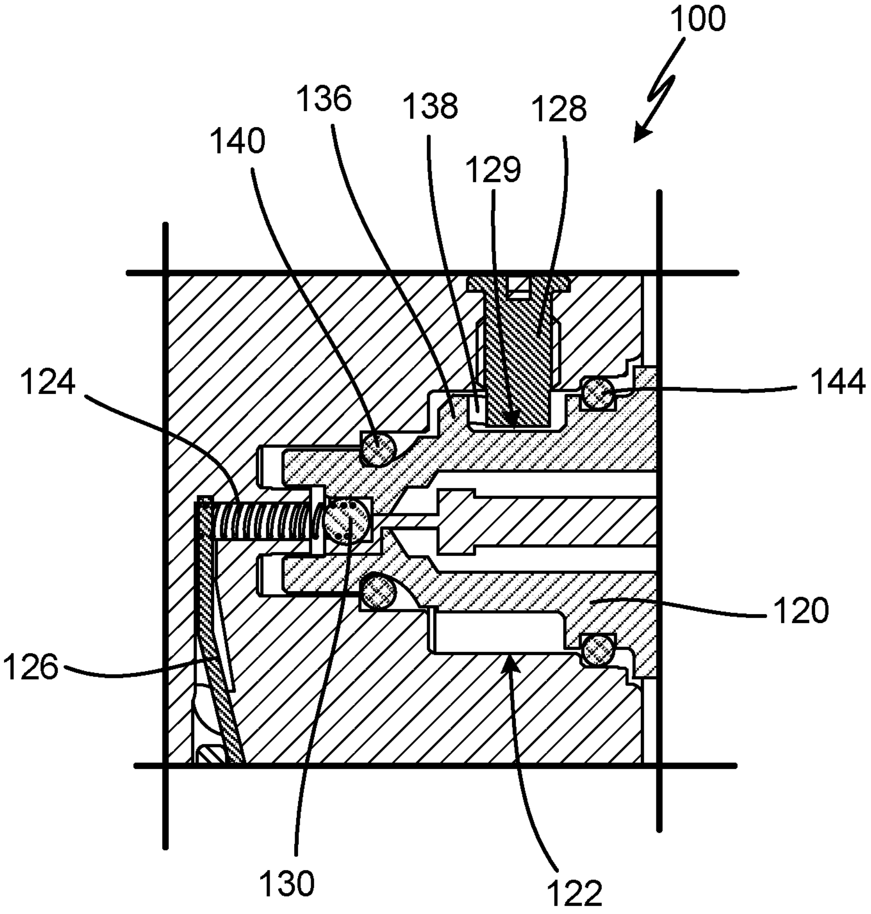
FIG. 5C is a cross-sectional view of the probe in the home position.
Figures 6A, 6B, 6C:
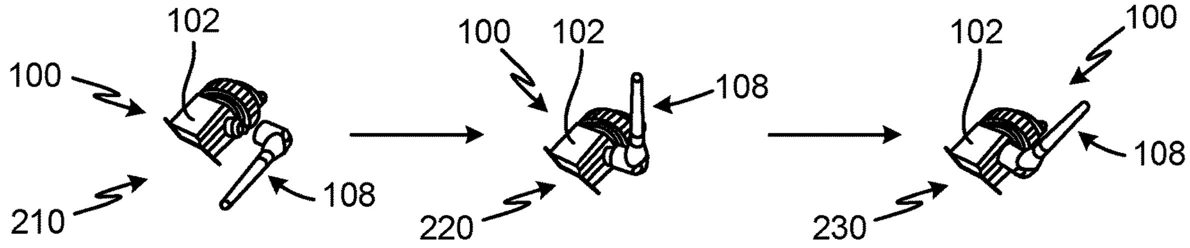
FIG. 6A is a partial isometric view showing a probe in a starting position relative to an electrostatic spray gun.
FIG. 6B is a partial isometric view showing the probe intermediate the starting position and the home position.
FIG. 6C is a partial isometric view showing the probe in the home position.

FIG. 5A is a cross-sectional view of probe 108 adjacent to the starting position. FIG. 5B is cross-sectional view of probe 108 intermediate the starting position and the home position. FIG. 5C is cross-sectional view of probe 108 in the home position. FIG. 6A is a partial isometric view showing probe 108 in a starting position relative to electrostatic spray gun 100. FIG. 6B is a partial isometric view showing probe 108 intermediate the starting position and the home position. FIG. 6C is a partial isometric view showing probe 108 in the home position. FIGS. 5A-5C and 6A-6C will be discussed together. FIGS. 5A-5C and 6A-6C also show electrostatic spray gun 100 including barrel 102, probe 108, probe mount 120, recess 122, spring 124, wire 126, pin 128, conductive ball 130, flange 136, notch 138, first elastomeric ring 140, and second elastomeric ring 144.

FIGS. 5A-5C and 6A-6C show the process of mounting probe 108 to probe mount 120 from the starting position 210, to the intermediate position 220, and to the home position 230. Mounting of probe 108 to barrel 102 of electrostatic spray gun 100 begins with probe in position 210, which places probe 108 in the starting position as shown in FIGS. 5A and 6A. As shown in FIG. 5A probe 108 is pushed onto probe mount 120 until pin 128 travels through gap 158 and into pin slot 129. With pin 128 disposed in pin slot 129, probe is rotated about probe mount 120.

Probe 108 is rotated from the starting position 210 to the home position 230 through the intermediate position 220. FIGS. 5B and 6B show probe 108 in an intermediate position 220 between the starting position 210 and the home position 230. As probe 108 moves between the stating position 210 and the home position 230, flange 136 engages pin 128 to prevent probe 108 from disengaging from probe mount 120. Pin 128 interfacing with flange 136 with probe 108 in the intermediate position prevents probe 108 from inadvertently disengaging from probe mount 120. This also provides advantages during operation as the user can inadvertently knock probe 108 from the home position 230. Probe 108 will not fall off of probe mount 120 but will instead remain on probe mount 120 and the user can simply rotate probe 108 back to the home position and resume operation.

Shoulder 148 pushes first elastomeric ring 140 along dynamic groove 142 causing first elastomeric ring 140 to move down along dynamic groove 142, enlarging the diameter of first elastomeric ring 140 such that first elastomeric ring 140 exerts a force on probe 108 to bias probe 108 away from electrostatic spray gun 100. Spring 124 is compressed as probe 108 is pushed onto probe mount 120, which also generates a force to bias probe 108 away from electrostatic spray gun 100. Probe 108 is rotated to the home position 230, as shown in FIGS. 5C and 6C. With probe 108 in the home position, the biasing force exerted by first elastomeric ring 140 causes pin 128 to enter into notch 138. With probe 108 in the home position, first elastomeric ring 140 continues to exert the biasing force on probe 108. The force exerted by first elastomeric ring 140 together with spring 124 and the interface between pin 128 and notch 138 secures probe 108 in the home position during operation. Probe 108 can be removed from gun 100 by simply rotating probe 108 from the home position 230 to the starting position 210 and then pulling probe 108 away from barrel 102 along probe mount 120. In some embodiments, probe 108 is rotated 180° around mount axis M from the starting position to the home position. In some embodiments, probe 108 is rotated less than 180° around mount axis M from the starting position to the home position. In some embodiments, probe 108 is rotated more than 180° around mount axis M from the starting position to the home position.

Figure 7:
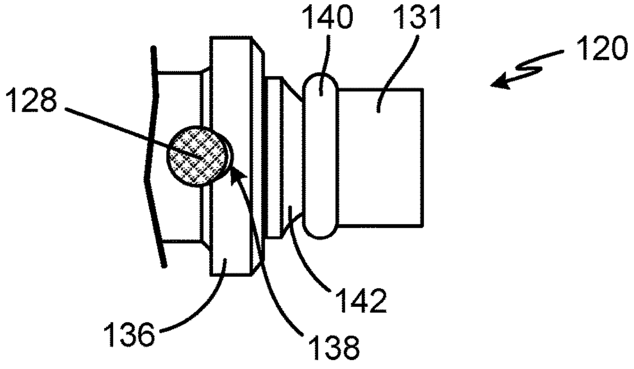
FIG. 7 shows one embodiment of the pin and notch when the probe is in the home position.

FIG. 7 shows one embodiment of the pin 128 and notch 138 when the probe 108 is in the home position. FIG. 7 show probe mount 120 including crown 131, flange 136, notch 138, first elastomeric ring 140, and dynamic groove 142. As shown in FIG. 7 pin 128 can sit partially within notch 138 such that pin 128 does not contact the entire surface defining notch 138. In the example shown, pin 128 and notch 138 have two points of contact. Pin 128 sitting partially within notch 138 and including discrete contact points reduces wear on pin 128 and on notch 138, increasing the useful life of pin 128 and of notch 138. It is understood that, in some examples, pin 128 can sit completely within notch 138.

Electrostatic spray guns can experience current leaks especially at assembly joints. These leaks can represent a shock hazard to a user. However, it is advantageous to be able to remove sub-parts for cleaning or replacement during the lifetime of the electrostatic spray gun such as a charging probe. The described mounting configuration reduces current leak through the attachment site compared to conventional electrostatic spray guns. Additionally, the mounting configuration retains the probe 108 in a home position during operation of the electrostatic spray gun.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A mounting configuration for an electrostatic spray gun, the mounting configuration comprising:

a probe having a first non-conductive body encasing a first conductive element;

a probe mount extending from the electrostatic spray gun along a mount axis, the probe mount including a second non-conductive body encasing a second conductive element;

a first elastomeric ring disposed about an exterior of the second non-conductive body and configured to interface with the first non-conductive body;

wherein the probe is movable relative to the probe mount between a starting position and a home position, wherein a pin extending from one of the first non-conductive body and the second non-conductive body is seated in a notch formed in the other one of the first non-conductive body and the second non-conductive body, the pin being disposed in the notch preventing rotation of the probe on the mount axis and relative to the probe mount;

wherein the pin is disposed in the notch with the probe in the home position and the pin is disposed outside of the notch such that the probe is rotatable on the mount axis relative to the probe mount with the probe in the starting position;

wherein the first conductive element is electrically connected to the second conductive element with the probe in the home position; and wherein the first elastomeric ring has a first diameter with the probe in the starting position and has a second diameter with the probe in the home position, the second diameter smaller than the first diameter, the first elastomeric ring configured to exert a force on the first non-conductive body to bias the first non-conductive body along the mount axis and away from the electrostatic spray gun such that the probe is secured in the home position.

2. The mounting configuration of claim 1, further comprising:

a second elastomeric ring disposed about the second non-conductive body, wherein the second elastomeric ring is positioned between the first elastomeric ring and the electrostatic spray gun.

3. The mounting configuration of claim 1, wherein the first elastomeric ring is positioned in a dynamic groove of the probe mount, the dynamic groove having a first diameter at a first end of the dynamic groove and a second diameter at a second end of the dynamic groove, wherein the second diameter is larger than the first diameter.

4. The mounting configuration of claim 3, wherein the dynamic groove has a curved shape extending between the first end and the second end.

5. The mounting configuration of claim 3, wherein the dynamic groove has a linear shape extending between the first end and the second end.

6. The mounting configuration of claim 1, wherein the pin partially enters the notch and rests on at least two tangential points of the notch.

* * * * *